Jan. 22, 1963   D. H. BALLARD ET AL   3,074,709
AIR SUSPENSION SYSTEMS FOR VEHICLES
Filed Aug. 29, 1960   3 Sheets-Sheet 3

INVENTORS
DONALD HENRY BALLARD
ALBERT EDWARD ELLIS
By: Norris & Bateman
    attorneys United States Patent Office 3,074,709
Patented Jan. 22, 1963

3,074,709
AIR SUSPENSION SYSTEMS FOR VEHICLES
Donald H. Ballard, Lincoln, England, and Albert E. Ellis, Wadeville, Germiston, Union of South Africa, assignors to Clayton Deuandre Company Limited, Lincoln, England
Filed Aug. 29, 1960, Ser. No. 52,568
Claims priority, application Great Britain Aug. 28, 1959
7 Claims. (Cl. 267—65)

This invention relates to air suspension systems for vehicles and to the kind in which the admission of compressed air to and the exhaust of air from the air springs is controlled by a levelling valve.

The object of the present invention is to provide an improved and simplified form of levelling valve designed to provide the advantage that the valve is used solely to pass air when the vehicle is stationary and is not subjected to continuous actuation caused by suspension movement.

According to the invention a levelling valve applicable to the control of an air spring device in a vehicle suspension is provided wherein the operation of valves controlling the inlet and exhaust of air or other fluid is effected by means of a probe operated by fluid under pressure and responsive to increase or decrease of load on the vehicle chassis to cause release of air from or admission of air to the air spring as conditions require, the said probe being moved to an inoperative position to prevent ingress or exhaust of pressure fluid while the vehicle is travelling.

According to a preferred form of the invention a levelling valve mechanism applicable to the control of an air spring device in a vehicle suspension includes a system of valves for controlling the inlet and exhaust of pressure fluid to or from the air spring, a probe adapted to be extended from a cylinder by the application of pressure fluid to the valve system into a position wherein it is actuated from an axle of the vehicle while the latter is stationary and means for placing the valve system under atmospheric pressure while the vehicle is travelling to enable the probe to be retracted by pressure from the air spring into an inoperative position within the cylinder and thereby prevent communication through the valve mechanism between the chassis and axle.

Figure 1:
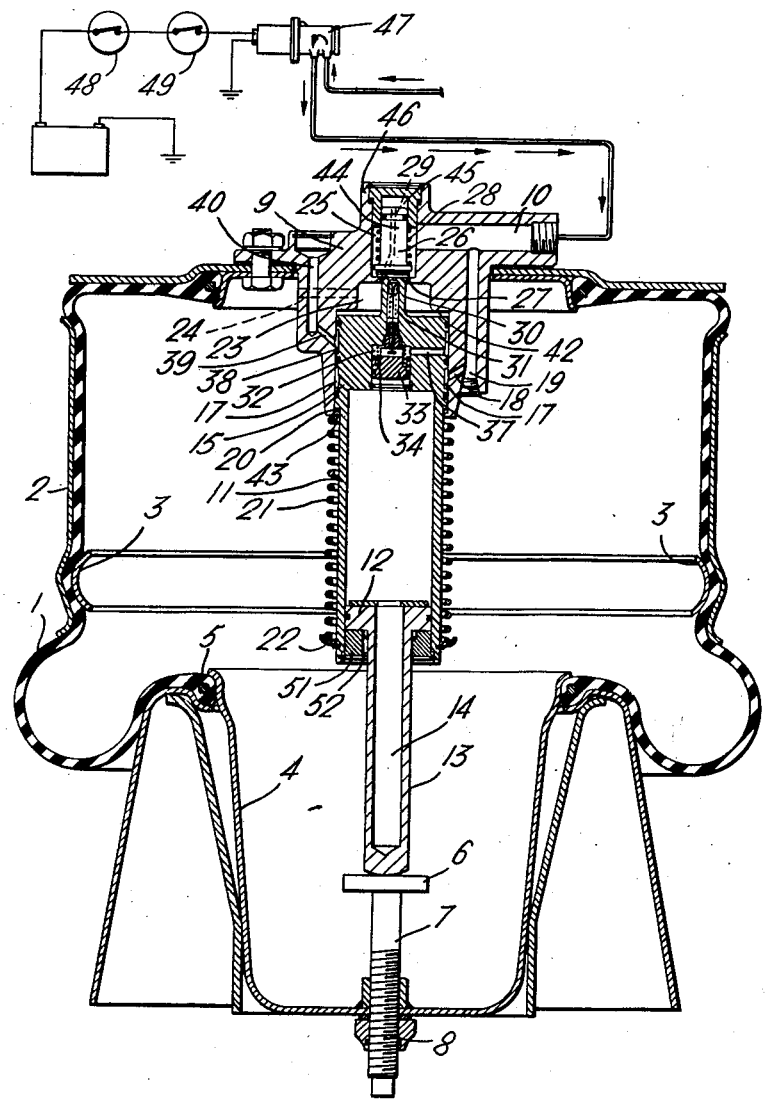
Figure 2:
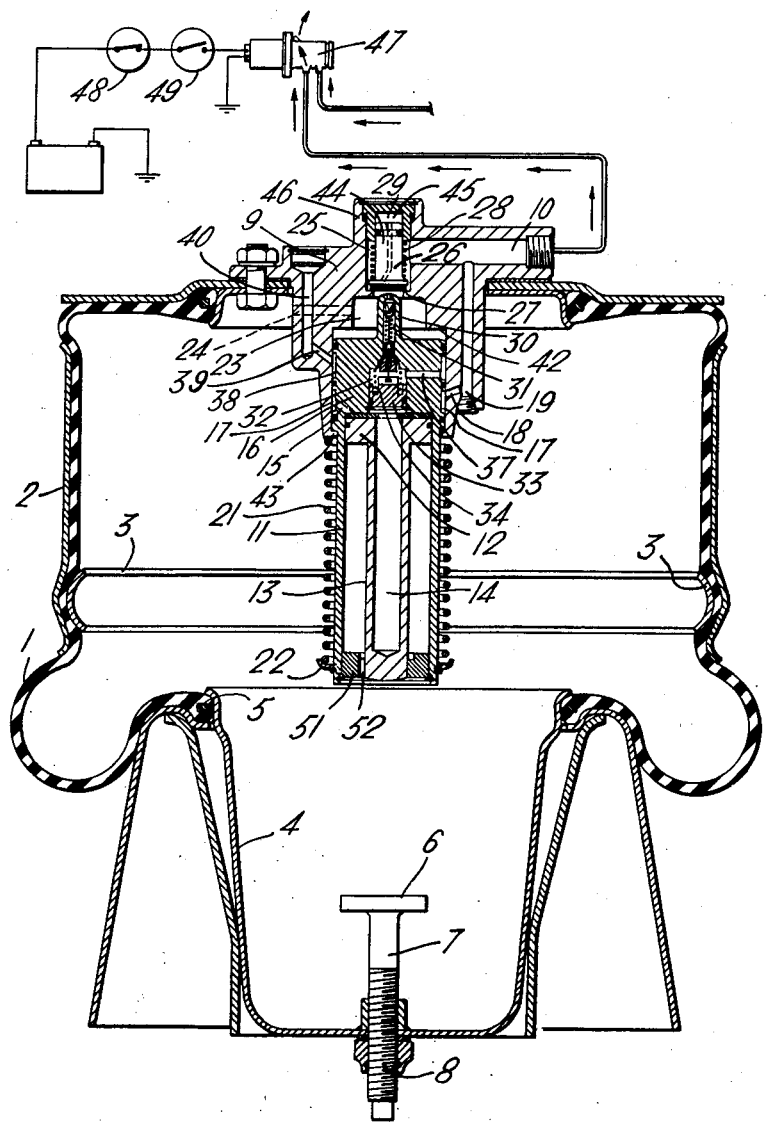
Figure 3:
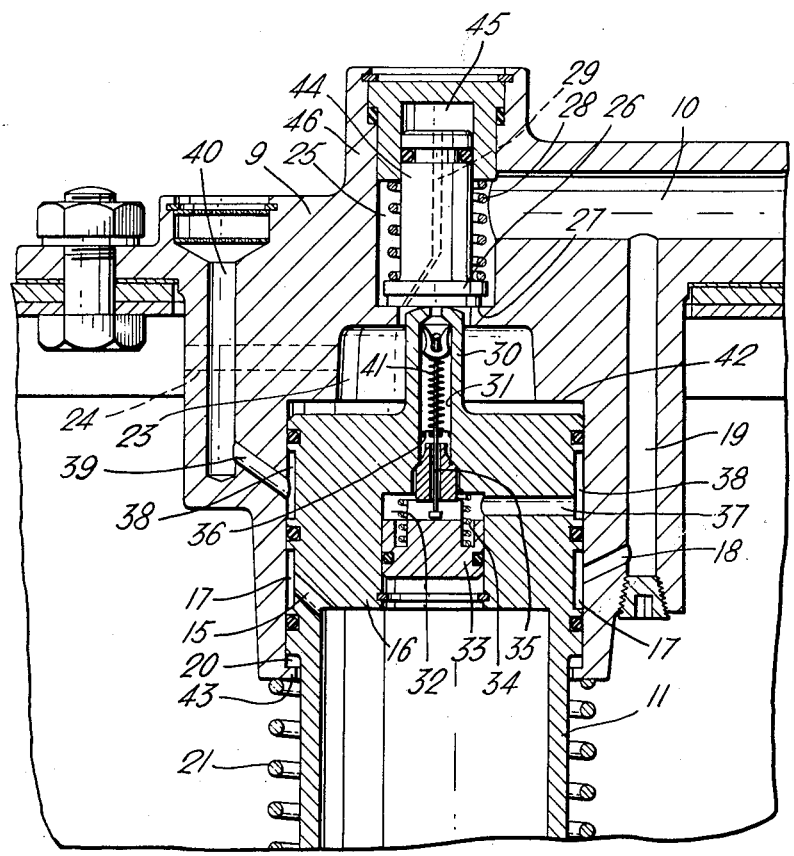

Reference will now be made to the accompanying drawings which show by way of example an air spring unit embodying a levelling valve constructed according to the invention and in which:

FIG. 1 is a sectional elevation showing the parts in the positions occupied when the vehicle is stationary, FIG. 2 is a sectional elevation showing the parts in the positions occupied when the vehicle is in motion, and FIG. 3 is a detail view showing the valve arrangments on an enlarged scale.

In the construction illustrated the levelling valve mechanism is disposed centrally within an air spring which is formed of flexible or expansible material 1 the upper portion being maintained in substantially cylindrical form by metallic reinforcing components comprising an external sleeve 2 and an internal reinforcing ring 3. The base of the air spring is in the form of a metallic cup 4 whose periphery is connected at 5 to the free lower portion of the flexible or expansible material 1 thereby allowing for expanding and contracting movements of the air spring. Within the metallic base 4 is a striking plate 6 carried at the upper end of a stem 7 which projects downwards through the base at 8 for connection to an axle of the vehicle. The air spring per se forms no part of the present invention and its design may be of any known character to which the levelling valve now to be described may be applicable.

The levelling valve includes a housing 9 adapted to be carried directly or indirectly by the vehicle chassis and to extend downwards centrally into the air spring. At the top of the said housing is an inlet 10 through which air at high or at atmospheric pressure enters according to whether the vehicle is stationary or in motion. Depending from the said housing but movable relatively thereto is a cylindrical chamber 11 in which a piston 12 is movable and from which a probe 13 extends vertically downward, the said probe in its fully extended position making contact with the striking plate 6. The base of the cylindrical chamber 11 is provided with a closure member 51 having a central aperture through which the probe 13 passes. Adjacent this central aperture is a port 52 through which pressure fluid from the air spring 1 can enter the chamber 11 as hereinafter described but in the position shown in FIG. 1 the probe 13 is maintained in the extended position because the pressure of the air supply is higher than the pressure within the air spring 1. The probe is hollow and its interior 14 communicates at its upper end with the interior of the cylindrical chamber 11 whose upper end is in permanent communication with the air inlet 10 by way of a port 15 in the head 16 of the chamber 11, an annular passage 17 around the said head, and a port 18 and passage 19 in the housing 9. The head 16 of the cylindrical chamber 11 is of slightly enlarged diameter and is movably mounted, in the manner of a piston, in a cylindrical recess 20 formed centrally in the lower part of the housing 9. An exhaust spring 21 extending between the base of the housing 9 and an annular flange 22 around the base of the chamber 11 tends to urge the chamber into its lowermost position as shown in FIG. 1. The space 23 above the chamber 11 in the cylindrical recess 20 is in permanent communication with the interior of the air spring by way of a passage 24.

The air inlet 10 is in direct communication with an inlet valve chamber 25 formed in the head of the housing 9. The inlet valve member 26 is carried at the lower end of a cylindrical member 44 movable in a cylindrical recess 45 constituting an upper extension of reduced diameter of the valve chamber 25 and formed in a projecting portion 46 on the head of the housing 9. The inlet valve member 26 is urged downwardly onto its seating 27 by a spring 28 and the upper part of the recess 45 is in permanent communication with the interior 1 of the air spring by a passage 29 which communicates with the space 23.

The upper end of the head of the cylindrical chamber is formed (or provided) with a primary exhaust valve member 30 (FIG. 3) which can abut against the inlet valve member 26 and the primary exhaust valve member has a vertical bore 31 passing completely through it to the interior of the cylindrical chamber 11. The lower portion of the bore 31 is of enlarged diameter at 32 to accommodate a piston 33 responsive to pressure within the cylindrical chamber 11 to rise against the action of a spring 34 and operate the stem 35 of a secondary exhaust valve 36, movable against the resistance of a spring 41, which controls communication via a lateral passage 37 in the head 16 of the cylindrical chamber, a peripheral passage 38 around said head and a passage 39 through the housing 9 with an exhaust port 40. The movements of the head 16 are limited by an annular shoulder 42 at the head of the cylindrical recess 20 and by an annular stop 43 at the base of said recess.

The operation of the levelling valve above-described is as follows:

When the vehicle is stationary the levelling valve is in its neutral position as shown in FIG. 1 with the inlet valve 26 and the primary exhaust valve 30 in their closed positions thereby preventing admission or escape of air from the air spring 1. During this time when high pressure air is acting through the cylindrical chamber 11 on the probe 13, these two components constitute in effect a solid column for the purpose of valve actuation. Should the load on the chassis be increased, decreasing the volume of the air spring 1 the cylindrical chamber 11 and probe 13 will move in an upward direction and unseat the inlet valve 26 to admit high pressure air to the interior of the air spring 1 through space 23 and passage 24 and this inflow of air will continue until the inlet valve 26 returns to its closed position. Excess movement of the inlet valve 26 is prevented by the head 16 of the cylindrical chamber coming into contact with the annular stop shoulder 42 and any further upward movement is accommodated by the probe 13 sliding into the cylindrical chamber 11. When a decrease in weight on the chassis occurs accompanied by increase in the volume of the air spring 1, the exhaust spring 21 moves the cylindrical chamber 11 and probe 13 in a downward direction allowing air under pressure from the interior of the spring 1 to pass to atmosphere initially by way of the primary exhaust 30 which is moved downwards with the head 16 to allow the air to pass through the passage 31, past the secondary exhaust valve member 36 (held open by the piston 33 under the influence of pressure in the chamber 11) and thence through port 37, peripheral passage 38, and passage 39 to exhaust port 40. The downward movement of the cylindrical chamber 11 continues until it is arrested by contact of its head 16 with the annular stop 43 at the base of the cylindrical recess 20. This state will be maintained until the probe 13 makes contact with the striker plate 6 returning the cylindrical chamber and probe to the position wherein the primary exhaust valve member 30 seats on the inlet valve member 26.

When the vehicle is travelling the positions of the parts are as shown in FIG. 2. The levelling valve is cut off from the source of high pressure air and the interior of the cylindrical chamber 11 is at atmospheric pressure. With atmospheric pressure in the cylindrical chamber 11 and acting on the interior 14 of the probe, the pressure within the air spring 1 acting through the port 52 moves the probe 13 in an upward direction into the cylindrical chamber until it makes contact with the base of the head 16. Simultaneously, the exhaust spring 21 moves the cylindrical chamber 11 downwardly to the limit of its movement, this action moving the primary exhaust valve member 30 clear of the inlet valve member 26. Air under pressure is prevented from escaping because the secondary exhaust valve member 36 is seated due to the action of the piston 33 at the head of the cylindrical chamber 11 which is moved downwards by the action of its spring 34 against atmospheric pressure. Thus with atmospheric pressure in the inlet port 10, the pressure within the air spring 1 is entrapped until such time as high pressure is again communicated to the inlet port 10. No valve movements take place during this period, the distance between the base of the cylindrical chamber 11 and the striking plate 6 being designed to accommodate the full upward movement of the air spring 1. While the vehicle is travelling the pressure in the air spring fluctuates due to variations in volume. The inlet valve 26 is of the balanced type to ensure that during periods of increasing pressure the valve is held firmly on its seat to prevent escape of entrapped air from the air spring. This is achieved by allowing pressure from the air spring to pass to the upper side of the inlet valve member through passage 29 imparting thereby an increased thrust to maintain adequate seat pressure which is assisted by the pressure of spring 28.

One form of control for the levelling valve above described includes a solenoid operated air pressure valve 47 controlled by an electrical circuit containing two switches one of which is a vehicle master switch 48 and the other a controlling switch 49 which can be operated in any of a number of ways to ensure that air is fed to the valve inlet 10 through the conduit 50 when the vehicle is approaching or in the stationary state. Alternatively, a purely mechanical control system may be employed with a control valve actuated by mechanical linkage and connected, for example, to the hand brake mechanism.

Various modifications may be made in the levelling valve construction above described without departing from the invention. For example, the striking plate 6 could be arranged to occupy any of a number of positions to give increased or decreased vehicle ground clearance for which purpose the striking plate could be formed as part of a piston operated by pressure or spring means. As a further modification, the probe 13 could be formed with differential areas, that is a smaller area in contact with spring pressure and a larger area in contact with high air (or other fluid) pressure. The valve devices and the air spring may be arranged to operate under any gas or fluid pressure and the levelling valve mechanism shown on an enlarged scale in FIG. 3 may be arranged as an entity separable from the air spring.

We claim:

1. In combination with an air spring device in a vehicle suspension operatively connected between the chassis and an unsprung part of the vehicle, means defining passages for the inlet and exhaust of air to and from the interior of said spring device, inlet and exhaust valves for the respective passages, an extensible and retractible probe within said spring device, said probe in extended condition being conditioned to be displaced in response to variations in load on the chassis, means operatively connecting said probe to control said valves to admit or exhaust air from the interior of said air spring in accord with increase or decrease respectively of the chassis load, and means for selectively retracting and holding said probe in inactive condition and closing both of said valves.

2. In combination with an air spring device in a vehicle suspension operatively interposed between the chassis and an unsprung part of the vehicle, pressure fluid inlet and outlet valves connected to the interior of said air spring, a probe mounted within said air spring for movement between a levelling control position where it operatively interconnects the chassis and said vehicle part so as to be displaced in response to relative movement between said chassis and said part due to variations in load on the chassis and an inactive position, fluid pressure operated means for selecting one or the other of said probe positions, and means operably connecting said probe to said valves when the probe is in said levelling control position for controlling the inlet and exhaust of fluid under pressure to and from the interior of said air spring device in accord with increase and decrease, respectively of the load on said chassis.

3. In the combination defined in claim 2, the mounting for said probe comprising a cylinder in constant communication with said inlet valve so that the fluid pressure within said cylinder is always the pressure of the fluid at said inlet valve, a piston slidable in said cylinder and the probe being an extension from said cylinder, and means for selectively introducing compressed air or air at atmospheric pressure through said inlet valve.

4. In the combination defined in claim 3, means shiftably mounting said cylinder for limited movement within said air spring in operative connection with said valves.

5. In combination with an air spring device in a vehicle suspension operatively interposed between the chassis and an unsprung part of the vehicle connected to the chassis by said suspension, a housing member on said spring, a cylinder assembly having a head slidably mounted for limited movement in said member and a projecting cylinder, a piston slidably mounted in said cylinder, a probe movable with said piston and projecting from said cylinder toward said unsprung part, means defining an air inlet passage in said housing member communicating with a space within said member at the side of said head opposite said cylinder, means defining a connecting passage between said space and the interior of said air spring, an inlet valve in said inlet passage, means defining a probe control passage through said member and constantly communicating the air inlet passage pressure to the interior of said cylinder, means on said cylinder head adapted to actuate said inlet valve when the cylinder is displaced in one direction, means defining an exhaust passage from said space through said cylinder head and said housing member, an exhaust valve in said exhaust passage controlled by displacement of said cylinder assembly, and means for connecting said inlet passage to a source of air under pressure or to atmosphere.

6. In the combination defined in claim 5, said cylinder head comprising a hollow end section containing one end of said exhaust passage and adapted to abut against said inlet valve to close said exhaust passage, and spring means biasing said cylinder assembly toward said exhaust closed position, said exhaust passage being open to said space only when said cylinder head moves from abutment with said inlet valve.

7. In the combination defined in claim 6, a secondary exhaust valve in the exhaust passage in said cylinder head, and means responsive to the air pressure in said cylinder for controlling said secondary exhaust valve.

References Cited in the file of this patent
UNITED STATES PATENTS

| | | |
|---|---|---|
| 2,787,475 | Jackson | Apr. 2, 1957 |
| 2,925,284 | Szostak et al. | Feb. 16, 1960 |
| 2,947,531 | Deist | Aug. 2, 1960 |